(12) United States Patent
Krajci et al.

(10) Patent No.: US 9,292,059 B2
(45) Date of Patent: Mar. 22, 2016

(54) ROBUST MICROPROCESSOR RESET LATCH

(75) Inventors: Martin Krajci, Palatine, IL (US); Jerremy Anderson, Arlington Heights, IL (US)

(73) Assignee: Continental Automotive Systems, INC., Auburn Hills, MI (US)

( * ) Notice: Subject to any disclaimer, the term of this patent is extended or adjusted under 35 U.S.C. 154(b) by 965 days.

(21) Appl. No.: 13/334,186

(22) Filed: Dec. 22, 2011

(65) Prior Publication Data

US 2013/0166936 A1    Jun. 27, 2013

(51) Int. Cl.
G06F 11/30 (2006.01)
G06F 1/00 (2006.01)
G06F 1/24 (2006.01)
G06F 1/26 (2006.01)

(52) U.S. Cl.
CPC ... *G06F 1/24* (2013.01); *G06F 1/26* (2013.01)

(58) Field of Classification Search
None
See application file for complete search history.

(56) References Cited

U.S. PATENT DOCUMENTS

| | | | | |
|---|---|---|---|---|
| 4,422,163 A | * | 12/1983 | Oldenkamp | 365/229 |
| 5,621,250 A | * | 4/1997 | Kim | 307/10.1 |
| 6,885,215 B1 | * | 4/2005 | Hou et al. | 324/764.01 |
| 2013/0166936 A1 | * | 6/2013 | Krajci et al. | 713/340 |

* cited by examiner

*Primary Examiner* — Tanh Nguyen

(57) ABSTRACT

A microprocessor reset control operates in one of two reset states and transitions from the first state to the second state when a first signal falls below a first threshold and from the second state to the first state when a second signal exceeds a second threshold.

6 Claims, 2 Drawing Sheets

ROBUST MICROPROCESSOR RESET LATCH

TECHNICAL FIELD

The present disclosure relates generally to microprocessor controls, and more particularly to a robust microprocessor reset latch.

BACKGROUND OF THE INVENTION

During operation microprocessors receive a reset signal informing the microprocessor that power is available from a power source. When the reset signal goes low, the microprocessor knows that the power source is no longer available and the microprocessor shuts down to prevent damage or corruption. When the power source is restored, but does not have sufficient margin, the reset signal may oscillate, which causes the microprocessor to turn on and off repeatedly. This on/off oscillation of the microprocessor can cause unpredictable behavior of the microprocessor (such as incorrect startup or hang-up), and can corrupt the memory. In order to prevent the reset oscillations, known reset circuits use a sense circuit with hysteresis at the input of a voltage regulator providing the supply voltage to the microprocessor. The reset level is typically set to provide a safe margin for regulation, and the hysteresis is greater than any expected voltage sag and noise that can be present at the input. This approach reduces the low voltage operating range of the system.

SUMMARY OF THE INVENTION

A microprocessor reset control operates in one of two reset states and transitions from the first state to the second state when a first signal falls below a first threshold and from the second state to the first state when a second signal exceeds a second threshold.

A disclosed microprocessor reset circuit includes two sense inputs. The first sense input is from the higher voltage monitoring circuit. This higher voltage powers a regulator. The regulator provides a regulated voltage to the microprocessor. The first sense input is set to the second threshold level described above. The second sense input is an undervoltage sense from the regulator that provides regulated voltage to the microprocessor. The sensing level is set to the first threshold. The latching circuit is operable to output a microprocessor reset signal based on the inputs.

These and other features of the present invention can be best understood from the following specification and drawings, the following of which is a brief description.

DETAILED DESCRIPTION

Figure 1:
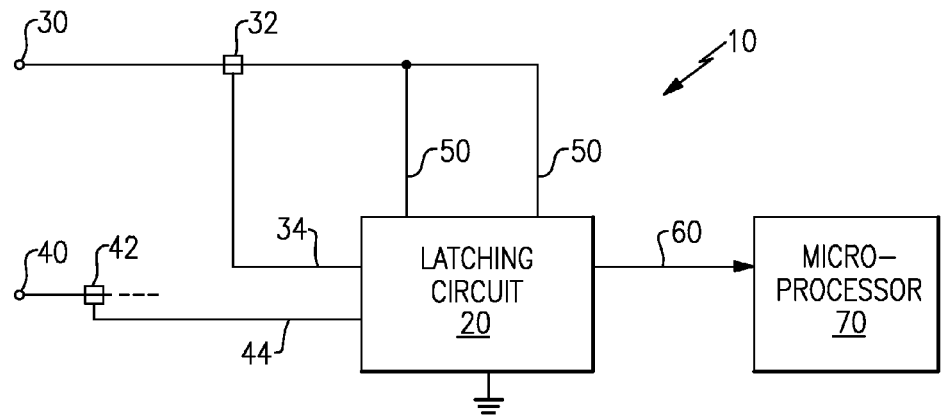
FIG. 1 illustrates a robust latching reset circuit.

FIG. 1 illustrates a reset control circuit 10 with a robust latching circuit 20. A sensor 32 reads the voltage of the power input 30 (alternately referred to as a regulated voltage 30) and provides a reference power sensor output 34 to the latching circuit 20. A power source 40, such as a vehicle battery, provides power to the entire system including the power input 30. A sensor 42 reads the voltage of the power source 40 and provides a power source voltage sensor output 44 to the robust latching circuit 20. The robust latching circuit 20 utilizes the regulated power sensor output 34 and the power source voltage sensor output 44 to control a reset signal 60 that in turn controls the microprocessor 70.

The robust latching circuit 20 can operate in one of two states. In the first state, the latching circuit 20 outputs a high reset signal 60 indicating that the regulated voltage 30 is sufficient to provide power to the microprocessor 70. When the regulated voltage 30 begins decreasing, the reference power sensor output 34 of the reference signal 30 is compared to a reference signal threshold. When the reference signal 30 falls below the reference threshold, the robust latching circuit 20 transitions to the second state and latches in place.

In the second state, the latching circuit 20 provides a low (or zero) reset signal 60 to the microprocessor 70 indicating that there is insufficient power to operate the microprocessor 70. The higher voltage sensor 42 compares the unregulated voltage 40 to a higher voltage threshold and, when the power source threshold is exceeded, sends a signal 44 to the robust latching circuit 20. The robust latching circuit 20 then transitions back to the first state, and latches in place. In this way, the robust latching circuit 20 uses both the reference voltage and the power source voltage to control the reset signal. The second threshold is set sufficiently higher than the first threshold, thereby ensuring that power has fully returned to the system before transitioning from the second state to the first state and simultaneously allowing the microprocessor 70 to continue to function in the first state for as long as possible in low power conditions.

Figure 2:
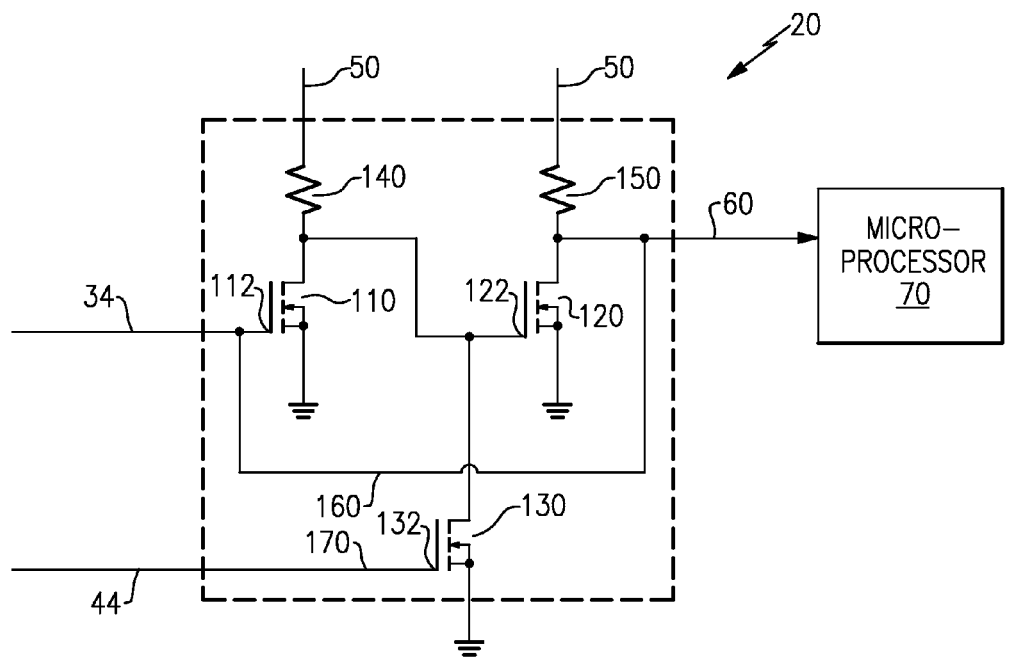
FIG. 2 illustrates a portion of the latching reset circuit of FIG. 1 in greater detail.

FIG. 2 illustrates an implementation of the robust latching circuit 20 of FIG. 1 in greater detail. The robust latching circuit 20 includes two n-channel metal oxide semiconductor field effect transistor (NMOS) logic inverter circuits. The first inverter circuit is formed by an n-channel MOS transistor 110 with a pull-up resistor 140. The output of this inverter drives the gate input 122 of the second inverter circuit. The second inverter circuit is formed by an n-channel MOS transistor 120 with a pull-up resistor 150. A bistable latch is formed by connecting the output of the second inverter to the input 112 of the first inverter with a feedback connection 160. A third n-channel MOS transistor 130 can pull the input of the second inverter 122 to ground, thereby flipping the logical state of the bistable latch. The gate of the first inverter 112 can be pulled down by the regulated voltage sense output 34 which controls its logic state. This gate can also be pulled down by the second inverter transistor 120. The gate 170 of a the third transistor 132 is controlled only by the output 44 of the higher voltage sensor 42. The circuit is powered by the regulated voltage through power rails 50.

Momentary voltage lows sensed by the regulated voltage sensor on the output 34 will cause the input of the second inverter 122 to go high. This results in the output of the second inverter going low while at the same time holding the input of the first inverter low, effectively latching the low state of the circuit output 60, and preventing any sensed oscillation on the regulated voltage to propagate through the circuit, and holding the microprocessor in reset. To exit this state, after the higher voltage sense goes high, the third transistor 130 turns on, thereby turning off the second transistor 120, and releasing the reset line 60 to the microprocessor 70.

Figure 3A:
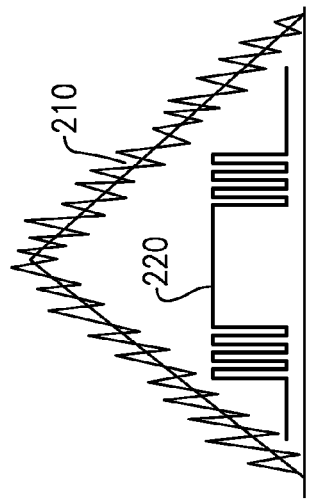
FIG. 3A illustrates typical behavior of a single threshold controlled reset signal when exposed to noisy input power.
Figure 3B:
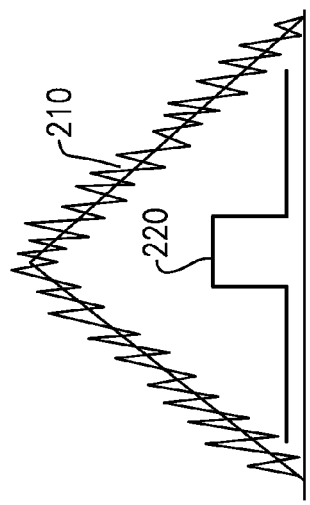
FIG. 3B illustrates typical behavior of a reset signal controlled by a power source voltage sensor with hysteresis when exposed to noisy input power.
Figure 3C:
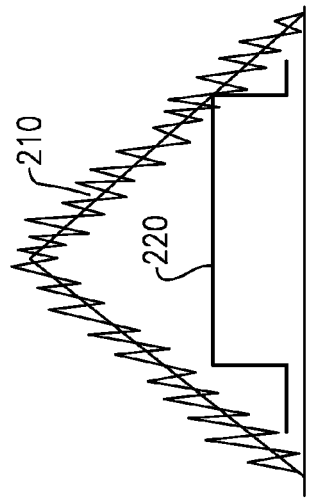
FIG. 3C illustrates the behavior of a reset signal generated by a two input latching circuit exposed to noisy input power.

FIGS. 3A, 3B, and 3C show typical behavior of a microprocessor reset signal 220 when noise is present on the power supply rail 210. This may be due to external factors, as well as load change, e.g. associated with putting microprocessor in reset. FIG. 3A illustrates an expected oscillatory behavior of a fixed threshold reset. FIG. 3B illustrates an expected behavior after introducing hysteresis in the reset circuitry, and FIG. 3C illustrates a behavior of a reset signal 220 operating with the above described robust latching circuit 20. As can be seen in the standard non-latching system without hysteresis (FIG. 3A), the reset signal 220 oscillates between high and low repeatedly whenever the reset signal 220 transitions from high to low or low to high. In a system implementing hysteresis, the transition is much cleaner, however the operating voltage range of the microprocessor is reduced, as can be seen in the reset signal 220 of FIG. 3B. The magnitude of the reset signals and the oscillation illustrated in FIGS. 3A-3C are exaggerated for demonstration purposes.

In a system using the robust latching circuit 20 described above, however, the transition is clean, as in the hysteresis model demonstrated in FIG. 3B, and retains the operating range of the non-latching non-hysteresis model demonstrated in FIG. 3A.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A microprocessor reset circuit comprising;
a regulated voltage signal;
a voltage sensor operable to sense a voltage on said regulated voltage signal, said voltage sensor having a sensed regulated voltage output signal;
a power source voltage signal;
a power source voltage signal voltage sensor, operable to sense a voltage on said power source voltage signal, said power source voltage signal sensor having a sensed power source voltage output signal;
a bistable latch circuit comprising first and second inputs and an output, the bistable latch circuit being configured to receive said sensed regulated voltage output signal as an input signal to the first input, and configured to receive the sensed power source voltage output signal as an input to the second input, the output of the bistable latch circuit being coupled to a reset input of a microprocessor, the bistable latch circuit additionally comprising:
a first resistor and a first transistor, configured to invert the sensed regulated voltage output signal received at the first input and thereby provide a sensed regulated voltage output signal complement;
a second resistor and a second transistor, configured to invert the sensed regulated voltage output signal complement and provide at the output of the bistable latch circuit, the reset signal to the reset input of the microprocessor;
a third transistor configured to selectively connect a control input of said second transistor to ground, responsive to a voltage level of said sensed power source voltage output signal received at the second input of the bistable latch, and which is input to a control input of the third transistor; and
a feedback connection coupled between the output of the bistable latch circuit and a control input of said first transistor, the feedback connection providing a feedback signal to the control input of said first transistor, said feedback signal causing the bistable latch circuit to latch to one of two different values;
wherein said bistable latch circuit is operable to provide a reset signal to the reset input of the microprocessor responsive to voltages on said first and second inputs of said bistable latch circuit.

2. The microprocessor reset circuit of claim 1 wherein a node connecting said first resistor to said first transistor is also the control input for said second transistor.

3. The microprocessor reset circuit of claim 1 wherein said first resistor and said first transistor are in series.

4. The microprocessor reset circuit of claim 1 wherein said second resistor and said second transistor are in series.

5. The microprocessor reset circuit of claim 1 wherein said output of the bistable latch circuit is a node connecting said second transistor to said second resistor.

6. The microprocessor reset circuit of claim 1 wherein said control input for said first transistor is a gate terminal of an NMOS transistor.

* * * * *